US007672565B2

(12) United States Patent
Aridome et al.

(10) Patent No.: US 7,672,565 B2
(45) Date of Patent: Mar. 2, 2010

(54) RECORDING CONTROL APPARATUS AND RECORDING CONTROL METHOD (75) Inventors: Kenichiro Aridome, Kanagawa (JP); Hironobu Miyazaki, Tokyo (JP); Yukio Isobe, Kanagawa (JP)

(73) Assignee: Sony Corporation, Tokyo (JP)

( * ) Notice: Subject to any disclaimer, the term of this patent is extended or adjusted under 35 U.S.C. 154(b) by 1281 days.

(21) Appl. No.: 10/537,920

(22) PCT Filed: Oct. 29, 2004

(86) PCT No.: PCT/JP2004/016455

§ 371 (c)(1),
(2), (4) Date: Jun. 8, 2005

(87) PCT Pub. No.: WO2005/043900

PCT Pub. Date: May 12, 2005

(65) Prior Publication Data

US 2006/0083489 A1    Apr. 20, 2006

(30) Foreign Application Priority Data

Oct. 30, 2003  (JP) ............................. 2003-371353

(51) Int. Cl.
*H04N 5/91* (2006.01)
*H04N 7/00* (2006.01)
*H04N 7/26* (2006.01)
*H04N 5/00* (2006.01)

(52) U.S. Cl. .................... 386/46; 386/124; 386/125; 386/126

(58) Field of Classification Search .................... 386/1, 386/46, 52, 83, 95, 120, 125–6; 348/390, 348/405, 419
See application file for complete search history.

(56) References Cited

U.S. PATENT DOCUMENTS 5,633,976 A * 5/1997 Ogino ........................ 386/120

(Continued)

FOREIGN PATENT DOCUMENTS

JP    09-163300    6/1997

(Continued)

OTHER PUBLICATIONS

Singapore Search and Examination Report mailed Mar. 14, 2006.

(Continued)

*Primary Examiner*—Marsha D Banks Harold
*Assistant Examiner*—Marc Dazenski
(74) *Attorney, Agent, or Firm*—Rader, Fishman & Grauer PLLC (57) ABSTRACT If it is detected that moving image data stored in a buffer increases in size beyond a first size and then reaches a second size, a portion of the moving image data from a head thereof stored in the buffer, corresponding to the first size, is retrieved and output as a moving image object. If it is detected that the final moving image data belonging to a chapter is stored in the buffer, the whole moving image data stored in the buffer is retrieved and output as a moving image object. Even immediately after the moving image data corresponding to the first size is retrieved from the buffer, the moving image object of the second size for seamless connection between chapters is acquired.

10 Claims, 7 Drawing Sheets

U.S. PATENT DOCUMENTS

| | | | |
|---|---|---|---|
| 5,754,241 A * | 5/1998 | Okada et al. | 375/240.05 |
| 5,951,646 A * | 9/1999 | Brandon | 709/231 |
| 6,393,196 B1 * | 5/2002 | Yamane et al. | 386/52 |
| 6,718,121 B1 * | 4/2004 | Shikunami | 386/109 |
| 7,254,318 B2 * | 8/2007 | Imada et al. | 386/112 |

FOREIGN PATENT DOCUMENTS

| | | |
|---|---|---|
| JP | 10-092158 | 4/1998 |
| JP | 2000-348467 | 12/2000 |
| JP | 2003-153206 | 5/2003 |

OTHER PUBLICATIONS

International Search Report mailed Feb. 15, 2005.

International Preliminary Report on Patentability; Int'l Appln. No. PCT/JP2004/016455; Int'l filing date: Oct. 29, 2004 (FORM PCT/IB/373).

Written Opinion of the International Searching Authority; Int'l Appln. No. PCT/JP2004/016455; Int'l filing date: Oct. 29, 2004 (FORM PCT/ISA/220).

* cited by examiner

RECORDING CONTROL APPARATUS AND RECORDING CONTROL METHOD

TECHNICAL FIELD

The present invention relates to a record control apparatus, and a record control method and, in particular, to a record control apparatus and a record control method for adjusting a size of a video object to perform seamless connection between chapters, and a program for causing a computer to perform the method.

BACKGROUND ART

Optical disks recording moving image (video) data and audio data attract attention as a recording medium. The optical disks are used not only as media of contents commodities, such as movies, but also as write media allowing users to write data thereon. Known as standards of the write media are DVD-R standards that permit data to be recorded in the same region one time only, and DVD-RW standards that permit data to be written repeatedly. Known as a file format of the optical media is the DVD-Video standard for replay-only disk. A write operation in compliance with the DVD-Video standard can be performed on even the write media.

In accordance with the DVD-Video standard, a maximum of 99 titles can be recorded on a per disk basis. Each title can contain a maximum of 99 chapters (PTT: Part of TiTle). When a recording operation is performed on each of the DVD-R and the DVD-RW using a camcorder (for camera and recorder), a single record unit from the start of recording to the end of the recording is recorded as a chapter. The data is thus recorded under the same title until a predetermined condition is satisfied. The predetermined condition to end the title is satisfied, for example, when a disk is ejected (discharged), when 99 chapters are reached under the same title, when 99 cells are reached under the same title, or when a recording mode is shifted from moving image recording to still image recording.

When the data recorded by the unit of chapter is played back, a slight gap takes place between chapters, and an image displayed appears momentarily interrupted. The record unit of the camcorder ranges typically from dozens of seconds to several tens of seconds, and playback interrupted at each connection between the record units is not preferable.

Seamless connection techniques for connecting video streams in a seamless manner have been proposed (for example, Japanese Examined Patent Application Publication No. 9-163300 (FIG. 1)).

In accordance with the disclosed technique, discrete images, each not reaching a minimum edit unit, are first moved to and collected on a semiconductor memory in order to play back images distributed over a plurality of different locations on an optical disk, and the discrete images thus collected are transferred to a new recording region on the optical disk. In this way, the minimum edit unit that permits seamless playback is established.

If a new recording region is set up as in the disclosed technique, data is stored on the optical disk in a duplicate manner, leading to a low recording efficiency. In particular, when data are recorded by chapter, the number of connection points in need of seamless connection is large, and it is unrealistic to set up recording regions for all connection points.

It is an object of the present invention to provide a record control apparatus that produce a video object having a size sufficient to perform seamless connection between chapters.

DISCLOSURE OF INVENTION

To overcome the above-described drawback, a record control apparatus of an invention (1) includes a buffer for storing moving image data belonging to a chapter, storage size detecting means for detecting that the moving image data stored in the buffer increases in size beyond a first size and then reaches a second size, final data detecting means for detecting that the final moving image data belonging to the chapter is stored in the buffer, and moving image object output means for retrieving a portion of the moving image data, stored in the buffer, corresponding to the first size from the head of the moving image data, and outputting the portion of the moving image data as a moving image object if it is detected that the moving image data stored in the buffer reaches the second size, and retrieving the whole moving image data stored in the buffer and outputting the retrieved moving image data as a moving image object if it is detected that the final moving image data belonging to the chapter is stored in the buffer. Even immediately after the moving image data corresponding to the first size is retrieved from the buffer, the moving image object of the second size for seamless connection between chapters is acquired.

In the record control apparatus of an invention (2) in accordance with the invention (1), the storage size detecting means includes size measurement means for measuring the size of the moving image data stored in the buffer, time measurement means for measuring time by converting the size of the moving image data stored in the buffer into time, and threshold detecting means for detecting that the time measurement means detects the second size after the size measurement means detects the first size. With this arrangement, the first size is measured based on the size of the moving image data, and the second size is measured by converting the size of the moving image data into time. The video object having the second size corresponding to time for seamless connection between chapters is acquired.

In the record control apparatus of an invention (3) in accordance with the invention (2), the storage size detecting means further includes threshold holding means for holding the first size and the second size and supplying the threshold detecting means with the first size and the second size. With this arrangement, the threshold in the storage size detecting means can be set to any value.

The record control apparatus of an invention (4) in accordance with the invention (3), further includes threshold setting means for setting the first size of the moving image object as a standard size of the moving image object, and the second size of the moving image object as a lower limit value of the moving image object for seamless connection in the threshold holding means. With this arrangement, threshold values are set in accordance with the standard size of the moving image object and the lower limit value of the moving image object for seamless connection.

In the record control apparatus of an invention (5) in accordance with the invention (1), the moving image object output means includes packing means for dividing the moving image data retrieved from the buffer into packs, each pack having a fixed length, and multiplexing means for multiplexing the packed moving image data and outputting the multiplexed moving image data as the moving image object. With this arrangement, a moving image object in accordance with the DVD-Video standard is generated.

An encoding system of an invention (6) includes moving image encoding means for encoding a moving image signal and outputting the encoded moving image signal as moving image data, audio encoding means for encoding an audio signal and outputting the encoded audio signal as audio data, a buffer for storing the moving image data belonging to a chapter, storage size detecting means for detecting that the moving image data stored in the buffer increases in size beyond a first size and then reaches a second size, final data detecting means for detecting that the final moving image data belonging to the chapter is stored in the buffer, moving image object output means for retrieving a portion of the moving image data, stored in the buffer, corresponding to the first size from the head of the moving image data, multiplexing the retrieved portion of the moving image data and the audio data as a moving image object, and outputting the moving image object if it is detected that the size of the moving image data stored in the buffer reaches the second size, and retrieving the whole moving image data stored in the buffer, multiplexing the retrieved moving image data and the audio data as a moving image object, and outputting the moving image object if it is detected that the final moving image data belonging to the chapter is stored in the buffer. In accordance with the encoding system, the moving image object of the second size for seamless connection between chapters is acquired in the encoding system even immediately after the moving image data corresponding to the first size is retrieved from the buffer.

A record control method of an invention (7) of a record control apparatus having a buffer storing moving image data belonging to a chapter, includes a step of encoding the moving image data and outputting successively the encoded moving image data to the buffer, a step of detecting that the moving image data stored in the buffer increases in size beyond a first size and then reaches a second size, a step of retrieving a portion of the moving image data, stored in the buffer, corresponding to the first size from the head of the moving image data, and outputting the retrieved portion of the moving image data as a moving image object if it is detected that the size of the moving image data stored in the buffer reaches the second size, a step of detecting that the final moving image data belonging to the chapter is stored in the buffer, and a step of retrieving the whole moving image data stored in the buffer and outputting the retrieved moving image data as a moving image object if it is detected that the final moving image data belonging to the chapter is stored in the buffer. In accordance with the recording method, the moving image object of the second size for seamless connection between chapters is acquired even immediately after the moving image data corresponding to the first size is retrieved from the buffer.

A record control method of an invention (8) of a record control apparatus having a buffer storing moving image data belonging to a chapter, includes a step of setting a first size of the moving image object as a standard size of a moving image object, and a second size of the moving image object as a lower limit value of the moving image object for seamless connection, a step of encoding the moving image data and outputting successively the encoded moving image data to the buffer, a step of detecting that the moving image data stored in the buffer increases in size beyond the first size and then reaches the second size, a step of retrieving a portion of the moving image data, stored in the buffer, corresponding to the first size from the head of the moving image data, and outputting the retrieved portion of the moving image data as a moving image object if it is detected that the size of the moving image data stored in the buffer reaches the second size, a step of detecting that the final moving image data belonging to the chapter is stored in the buffer, and a step of retrieving the whole moving image data stored in the buffer and outputting the retrieved moving image data as a moving image object if it is detected that the final moving image data belonging to the chapter is stored in the buffer. In accordance with the record control method, threshold values are set in response to the standard size of the moving image object and the lower limit value of the image object for seamless connection, and the moving image object of the second size for seamless connection between chapters is acquired even immediately after the moving image data corresponding to the first size is retrieved from the buffer.

A program of an invention (9) for causing a computer to perform a record control method of a record control apparatus having a buffer storing moving image data belonging to a chapter, includes a step of encoding the moving image data and outputting successively the encoded moving image data to the buffer, a step of detecting that the moving image data stored in the buffer increases in size beyond a first size and then reaches a second size, a step of retrieving a portion of the moving image data, stored in the buffer, corresponding to the first size from the head of the moving image data, and outputting the retrieved portion of the moving image data as a moving image object if it is detected that the size of the moving image data stored in the buffer reaches the second size, a step of detecting that the final moving image data belonging to the chapter is stored in the buffer, and a step of retrieving the whole moving image data stored in the buffer and outputting the retrieved moving image data as a moving image object if it is detected that the final moving image data belonging to the chapter is stored in the buffer. In accordance with the program, the moving image object of the second size for seamless connection between chapters is acquired even immediately after the moving image data corresponding to the first size is retrieved from the buffer.

A program of an invention (10) for causing a computer to perform a record control method of a record control apparatus having a buffer storing moving image data belonging to a chapter, includes a step of setting a first size of the moving image object as a standard size of a moving image object, and a second size of the moving image object as a lower limit value of the moving image object for seamless connection, a step of encoding the moving image data and outputting successively the encoded moving image data to the buffer, a step of detecting that the moving image data stored in the buffer increases in size beyond the first size and then reaches the second size, a step of retrieving a portion of the moving image data, stored in the buffer, corresponding to the first size from the head of the moving image data, and outputting the retrieved portion of the moving image data as a moving image object if it is detected that the size of the moving image data stored in the buffer reaches the second size, a step of detecting that the final moving image data belonging to the chapter is stored in the buffer, and a step of retrieving the whole moving image data stored in the buffer and outputting the retrieved moving image data as a moving image object if it is detected that the final moving image data belonging to the chapter is stored in the buffer. In accordance with the program, threshold values are set in response to the standard size of the moving image object and the lower limit value of the moving image object for seamless connection, and the moving image object of the second size for seamless connection between chapters is acquired even immediately after the moving image data corresponding to the first size is retrieved from the buffer.

The present invention provides a record control apparatus that assures a video object having a size required for seamless connection between chapters.

BEST MODE FOR CARRYING OUT THE INVENTION

The embodiments of the present invention are described in detail below with reference to the drawings.

Figure 1:
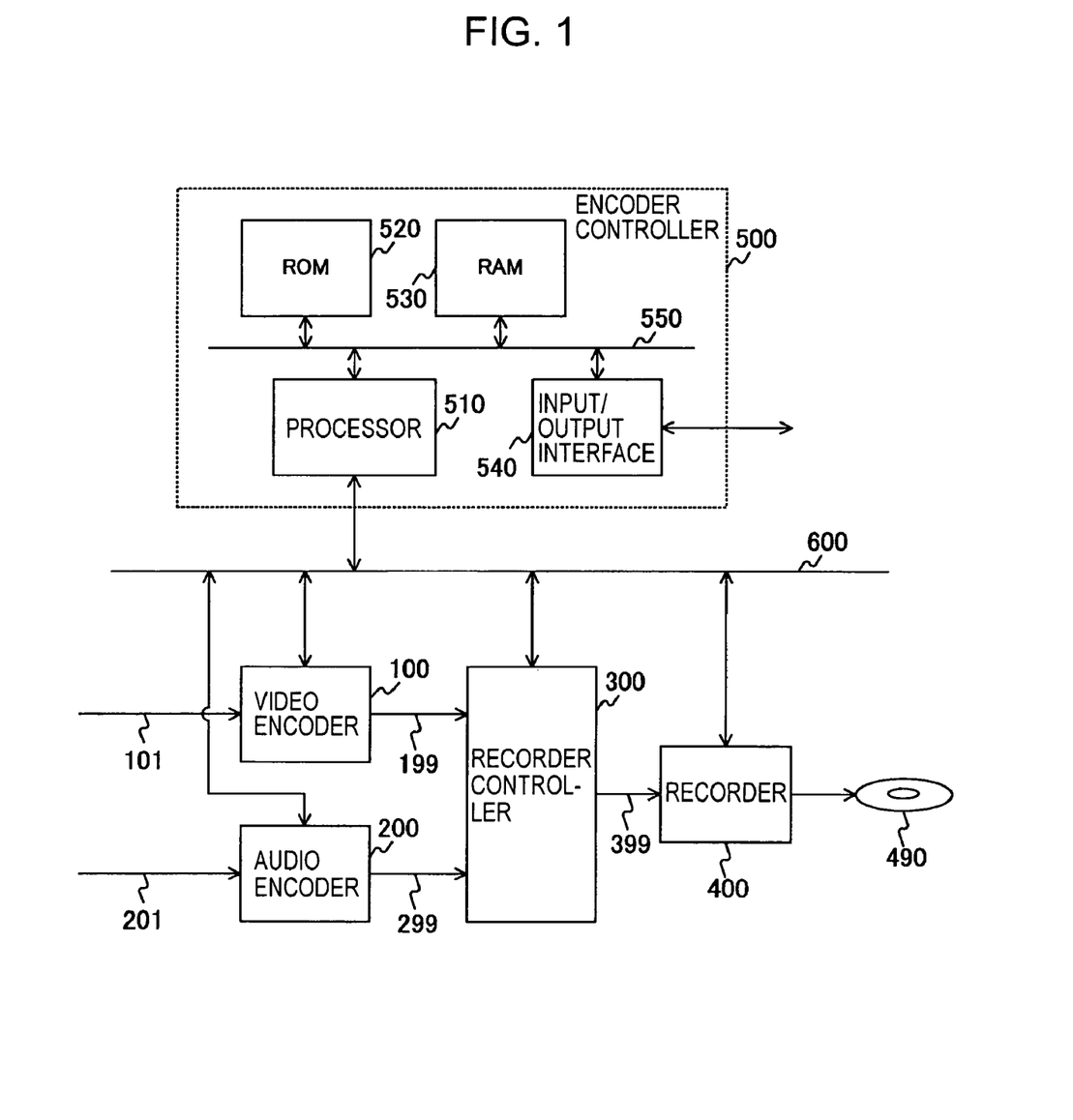
FIG. 1 illustrates an encoding system in accordance with an embodiment of the present invention.

FIG. 1 illustrates an encoding system in accordance with one embodiment of the present invention. The encoding system includes a video encoder 100 for encoding a moving image signal, an audio encoder 200 for encoding an audio signal and outputting the encoded audio signal as audio data, a recorder controller 300 for multiplexing outputs of the video encoder 100 and the audio encoder 200, a recorder 400 for recording stream data, multiplexed by the recorder controller 300, onto a recording medium 490, an encoder controller 500 for controlling the operation of the video encoder 100, the audio encoder 200, the recorder controller 300, and the recorder 400, and a system bus 600 for interconnecting these elements.

The video encoder 100 encodes a moving image signal supplied via a signal line 101, and supplies the encoded moving image data to a signal line 199. The audio encoder 200 encodes an audio signal supplied via a signal line 201 and supplies the encoded audio data to a signal line 299. The recorder controller 300 multiplexes the moving image data and the audio data, respectively supplied via the signal lines 199 and 299, into stream data in a data structure in compliance with the DVD-Video standard, and supplies the stream data to a signal line 399. The recorder 400 records the stream data, supplied via the line 399, onto a recording medium 490 in compliance with the DVD-Video standard.

The encoder controller 500 includes a processor 510, a ROM 520, a RAM 530, an input/output interface 540, and a bus 550 for mutually interconnecting these elements. The processor 510 controls encoding of the moving image signal and the audio signal and the start and stop of recording to the recording medium 490 while monitoring the progress of encoding in the video encoder 100 and the audio encoder 200. The ROM 520 stores a program executed by the processor 510, and a variety of parameters, and includes an EPROM such as a flash memory. The RAM stores job data required for the execution of the program, and includes an SRAM or DRAM, for example. The input/output interface 540 exchanges data with the outside, and is used to issues an instruction to start or stop recording to the recording medium 490, and to update the program in the ROM 520.

Figure 2:
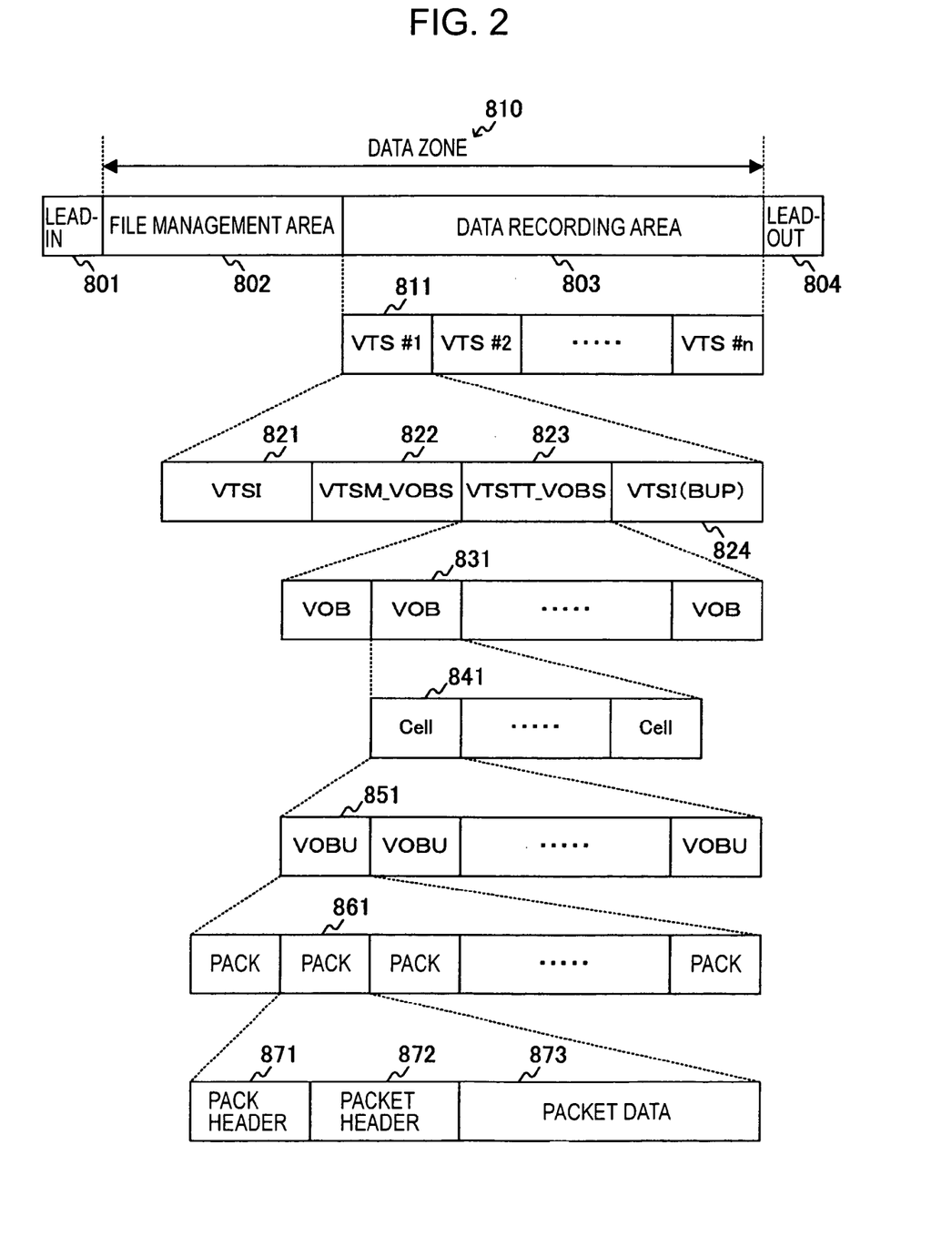
FIG. 2 illustrates a data structure in accordance with the DVD-Video standard.

FIG. 2 illustrates a data structure complied with the DVD-Video standard. The recording space of the recording medium 490, if viewed in a radial direction across the disk, is divided into a lead-in area 801, a file management area 802, a data recording area 803, and a lead-out area 804 in the order from inner to outer circles of the disk.

The file management area 802 includes a UDF (Universal Disc Format) zone, and a VMG (Video ManaGer) zone from the side of the lead-in area. The UDF zone and the VMG zone serve as a recording area recording management information of files, such as image data recorded on a DVD. The UDF zone supports UDF standards and ISO 9660 standards, thereby allowing a computer to read the DVD. The VMG zone serves as a recording area recording DVD management information.

The data recording area 803 records the moving image signal and the audio signal. The data recording area 803 records data according to a unit of data groups called a video title set (VTS) 811. Each video title set 811 is composed of video title set information (VTSI) 821, video title set menu (VTSM_VOBS: Video Object Set for the VTSM) 822, video title set title (VTSTT_VOBS: Video Object Set for Title in a VTS) 823, and backup (VTSI(BUP): Back-Up of VTSI) 824. The video title set information (VTSI) 821 is control information for a video title set. The video title set menu (VTSM_VOBS) 822 is a content for a variety of menus in the video title set. The video title set title (VTSTT_VOBS) 823 is a content for playing back a title. The backup (VTSI(BUP)) 824 is a backup copy of the video title set information 821.

The video title set title (VTSTT_VOBS) 823 holds an object set containing at least one video object (VOB) 831. The video object (VOB) 831 includes at least one cell 841. The cell 841 includes at least one video object unit (VOBU) 851. The VOBU 851 contains a moving image signal corresponding to one GOP (group of picture), and an audio signal corresponding thereto. One of the MPEG-2 system and the MPEG-1 system is used to encode the moving image signal. One of AC-3, linear PCM, and MPEG Audio is used to encode the audio signal.

The video object unit VOBU 851 is composed of a plurality of packs 861. Each pack 861 is composed of at least one packet. In this example, one pack contains one packet. More specifically, one pack contains a pack header 871 ahead of a packet, and the packet. The packet contains a packet header 872 and packet data 873 as data body. The DVD-Video standard specifies that one pack is 2048 bytes (corresponding to one sector). The moving image signal and the audio signal are encoded, and then divided into packs before being stored.

Figure 3:
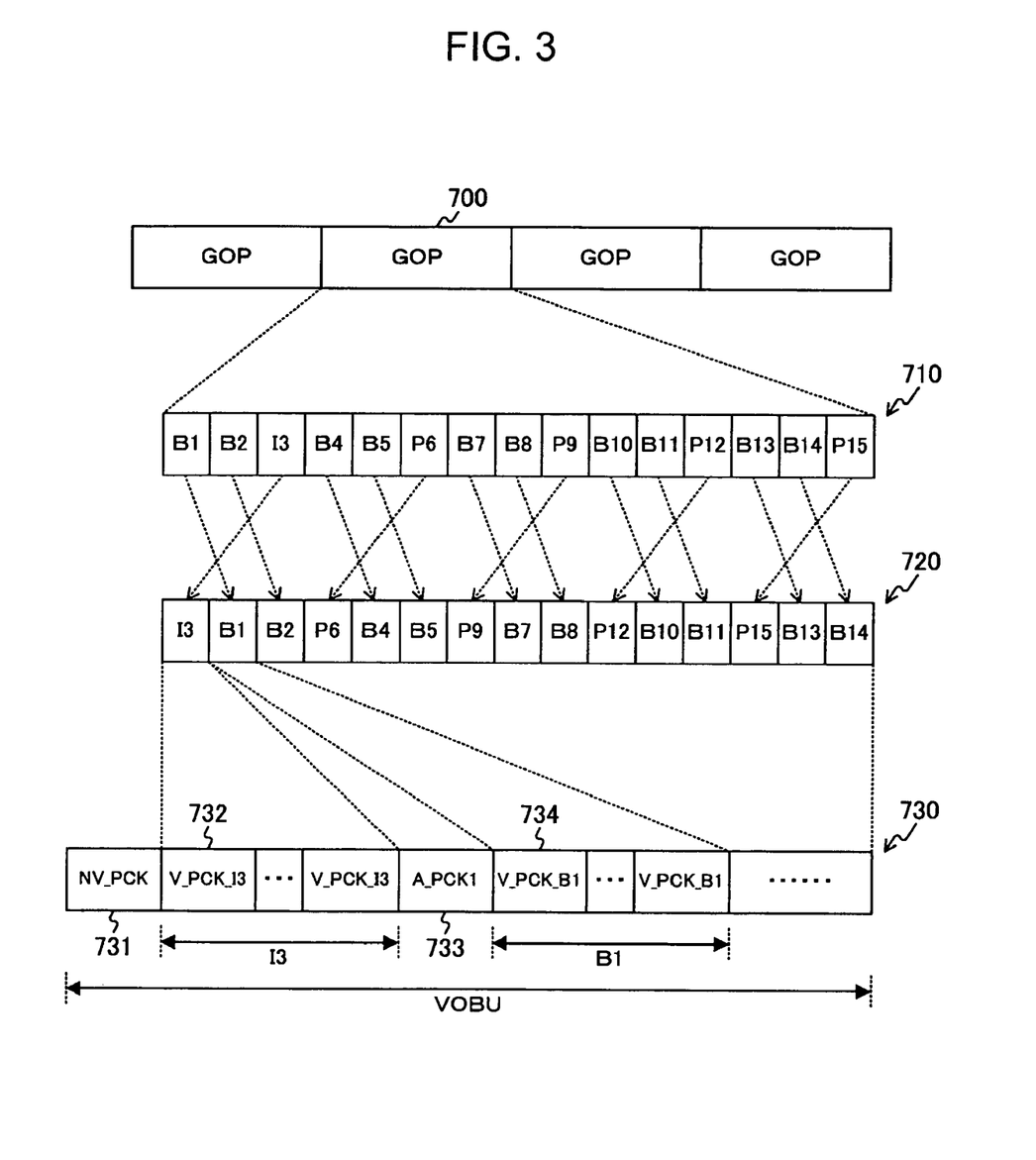
FIG. 3 illustrates a data structure in accordance with one embodiment of the present invention.

FIG. 3 illustrates one example of a data structure in accordance with the embodiment of the present invention.

The moving image data encoded by the video encoder 100 is divided into a GOP (group of pictures) composed of image frames. In this example, one GOP 700 is composed of 15 frames of unit image (B1 through P15).

One frame of image is classified as one of a I picture (Intra-picture), a P picture (Predictive picture), and a B picture (Bidirectionally predictive picture). The I picture is obtained by encoding data within a frame in the same sequential order as the original image. The P picture, namely a forward-predicted frame, is obtained by encoding data in the same sequential order as the original image. One GOP contains at least one picture.

In a unit image 710, I3 represents an I picture, each of B1, B2, B4, B5, B7, B8, B10, B11, B13, and B14 represents a B picture, and each of P6, P9, P12, and P15 represents a P picture. A suffixed number of each designate is a serial number of a frame unit and unrelated to the picture type.

A B picture is a bidirectinally-predicted frame. After an I picture and a P picture are encoded, the B picture is encoded and inserted between the encoded I picture and the encoded P picture. The B picture is thus encoded in a sequential order different from the original image. For this reason, the B picture is rearranged to come behind the I picture and the P picture, both of which are referenced during the bidirectionally predictive coding. In a unit image 720 subsequent to the rearrangement, B1 and B2 are arranged behind I3, and B4 and B5 are arranged behind P6.

The unit image 720 thus produced is packed into a VOBU 730. In the present embodiment, one VOBU corresponds to one GOP. Alternatively, one VOBU may contain two GOPs. A navigation pack 31 (NV_PCK) is arranged at the head of each VOBU. The navigation pack holds playback management information (such as control information indicating a sector to jump to).

A pack group 732 (V_PCK_I3) holds the moving image data corresponding to the unit image I3. The size of one pack is 2048 bytes. If the size of the moving image data is above 2048 bytes, the moving image data is divided into a plurality of packs for storage. A pack 733 (A_PCK1) holds the audio data. A pack group 734 (V_PCK_B1) holds the moving image data corresponding to the unit image B1.

Figure 4:
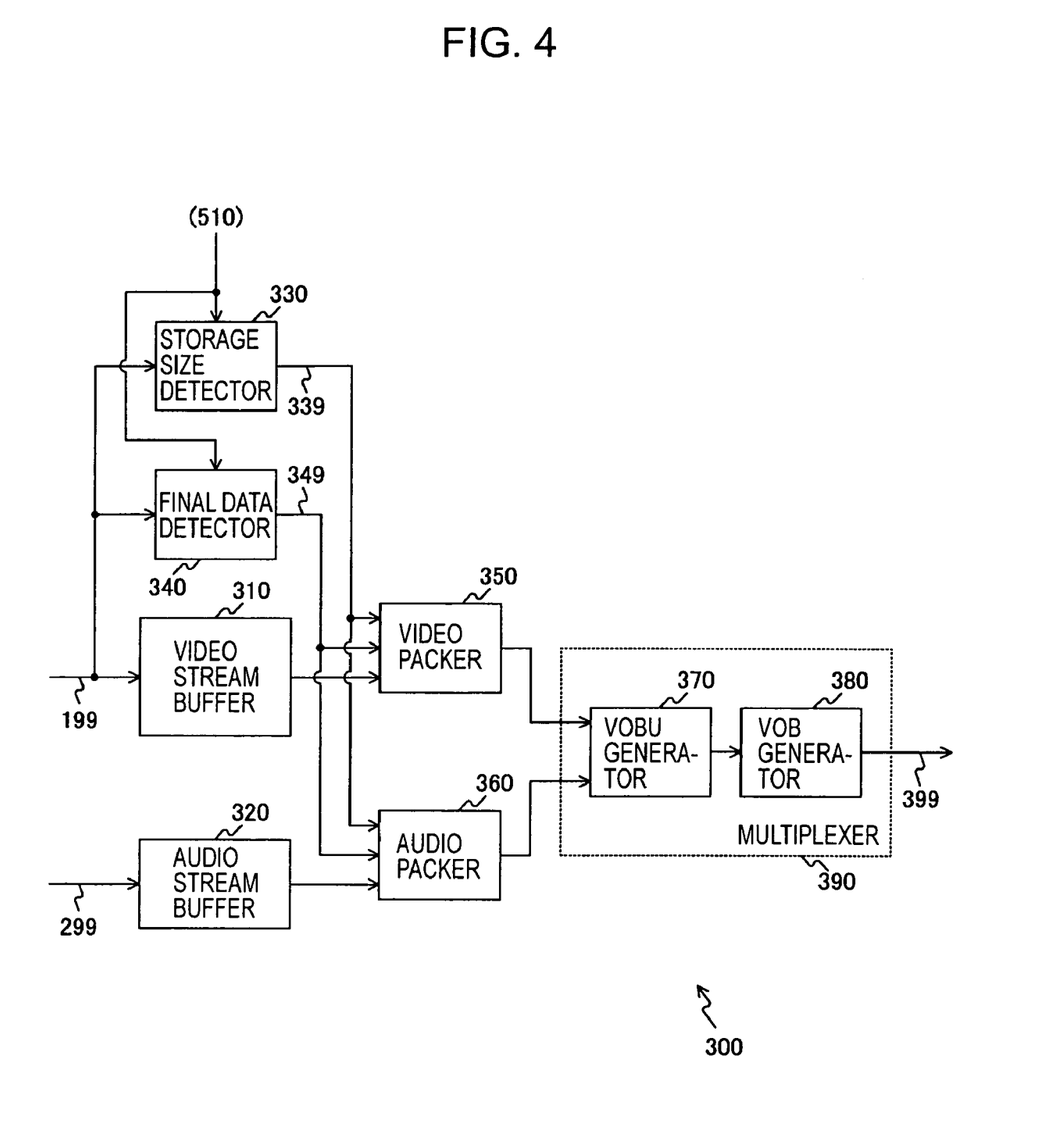
FIG. 4 illustrates a record control apparatus 300 in accordance with one embodiment of the present invention.

FIG. 4 illustrates one example of the recorder controller 300 in accordance with the embodiment of the present invention. The recorder controller 300 includes a video stream buffer 310, an audio stream buffer 320, a storage size detector 330, a final data detector 340, a video packer 350, an audio packer 360, and a multiplexer 390.

The video stream buffer 310 stores the moving image data supplied to the signal line 199 from the video encoder 100. The audio stream buffer 320 stores the audio data supplied to the signal line 299 from the audio encoder 200. The video stream buffer 310 and the audio stream buffer 320 works on a first-in first-out (FIFO) basis, and it outputs data from output terminals thereof in the order of input sequence.

The storage size detector 330 detects the size of the moving image data stored in the video stream buffer 310. Upon detecting that the moving image data stored in the video stream buffer 310 via the signal line 199 reaches a predetermined size, the storage size detector 330 so notifies the video packer 350 and the audio packer 360 via the signal line 399.

The final data detector 340 detects that the final moving image data belonging to a chapter is stored in the video stream buffer 310. The final data detector 340 learns the end of the chapter in response to the reception of a record stop instruction from the processor 510. Upon detecting that the final moving image data of the chapter is stored in the video stream buffer 310, the final data detector 340 so notifies the video packer 350 and the audio packer 360 via a signal line 349.

The video packer 350 retrieves the moving image data from the video stream buffer 310 to generate a video pack. Upon being notified by the storage size detector 330 via the signal line 339 that the moving image data stored in the video stream buffer 310 reaches the predetermined size, the video packer 350 retrieves moving image data smaller in size than the predetermined size from the video stream buffer 310 to generate a video pack. Upon being notified by the final data detector 340 via the signal line 349 that the final moving image data of the chapter is stored in the video stream buffer 310, the video packer 350 retrieves the whole moving image data stored in the video stream buffer 310 to generate a video pack.

The audio packer 360 retrieves the audio data from the audio stream buffer 320 to generate an audio pack. Upon being notified by one of the storage size detector 330 and the final data detector 340 of the above-described event, the audio packer 360 retrieves the audio data from the audio stream buffer 320, along with the moving image data retrieved from the video stream buffer 310, to generate the audio pack.

The multiplexer 390 multiplexes the video pack generated by the video packer 350 and the audio pack generated by the audio packer 360, thereby outputting a VOB. The multiplexer 390 is composed of a VOBU generator 370 and a VOB generator 380. The VOBU generator 370 attaches a navigation pack of FIG. 3 to each of the video pack and the audio pack, thereby generating a VOBU. The VOB generator 380 combines the VOBU generated by the VOBU generator 370, thereby generating a VOB.

Figure 5:
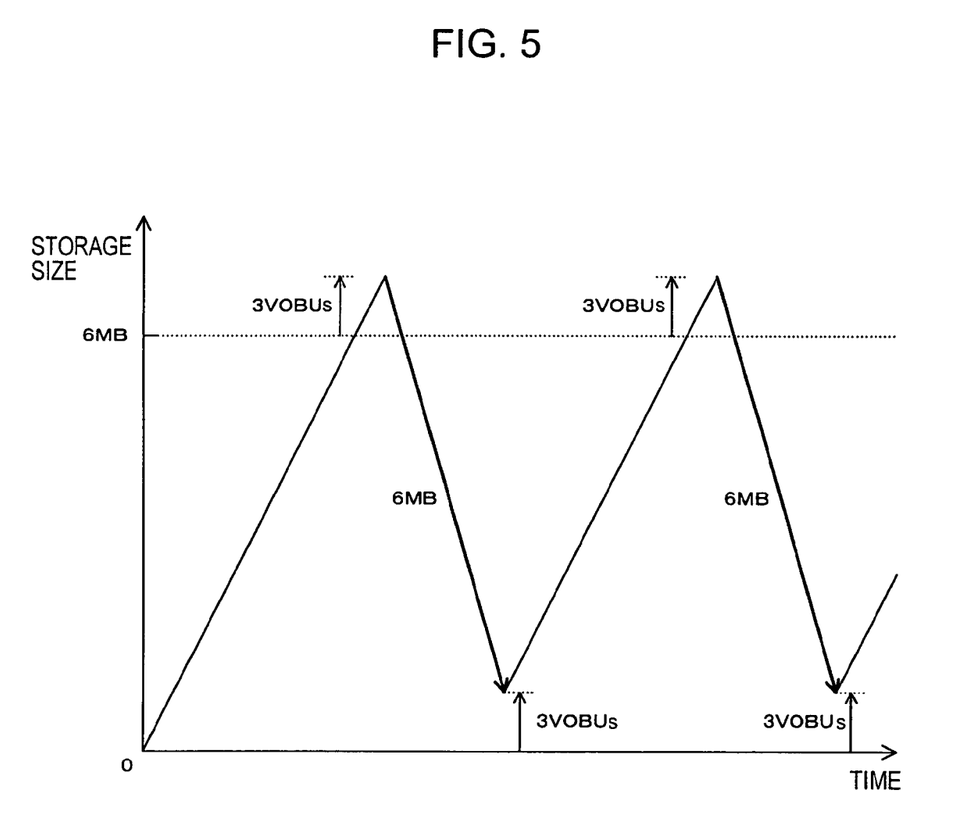
FIG. 5 illustrates a change in storage size of a video stream buffer 310 along the time axis.

FIG. 5 illustrates a chronological change in the storage size of the data in the video stream buffer 310 in accordance with the embodiment of the present invention. In FIG. 5, the ordinate represents a chronological change in the storage size of the data in the video stream buffer 310 and the abscissa represents time. The moving image data is input to the video stream buffer 310 at a predetermined speed (of 9.3 Mbps, for example). The stored moving image data is retrieved bit by bit by a predetermined amount of data at a time in response to an instruction from one of the storage size detector 330 and the final data detector 340. For the convenience of explanation, the retrieval of the data is assumed to be performed instantaneously.

For example, a standard size of the VOB is 6 Mbytes, and the data is retrieved from the video stream buffer 310 by 6 Mbytes as a predetermined amount of size at a time. The data retrieval is now performed as soon as data of 6 Mbytes is stored in the video stream buffer 310. If the chapter ends soon, the size of the final VOB can be small with almost no moving image data remaining in the video stream buffer 310. In accordance with the embodiment of the present invention, the data retrieval is performed when moving image data of a predetermined duration of time is stored after the data of 6 Mbytes is stored in the video stream buffer 310.

With one VOBU corresponding to one GOP, one VOBU is converted into a duration of time equal to 15 frames/29.97 Hz≈0.5005 second in NTSC (National Television Standards Committees). To assure the final VOB of the chapter equivalent to 1.5 seconds as one condition to perform seamless connection, at least three VOBUs are contained in one VOB. The retrieval is performed when three VOBUs as moving image data of a predetermined duration of time are stored after the moving image data stored in the video stream buffer 310 increases beyond 6 Mbytes.

In this arrangement, three VOBUs remain in the video stream buffer 310 even immediately after the moving image data of 6 Mbytes is retrieved from the video stream buffer 310. Even if the chapter ends immediately subsequent to the retrieval of the moving image data of 6 Mbytes, a size of the final VOB equivalent to 1.5 seconds or more is assured.

Figure 6:
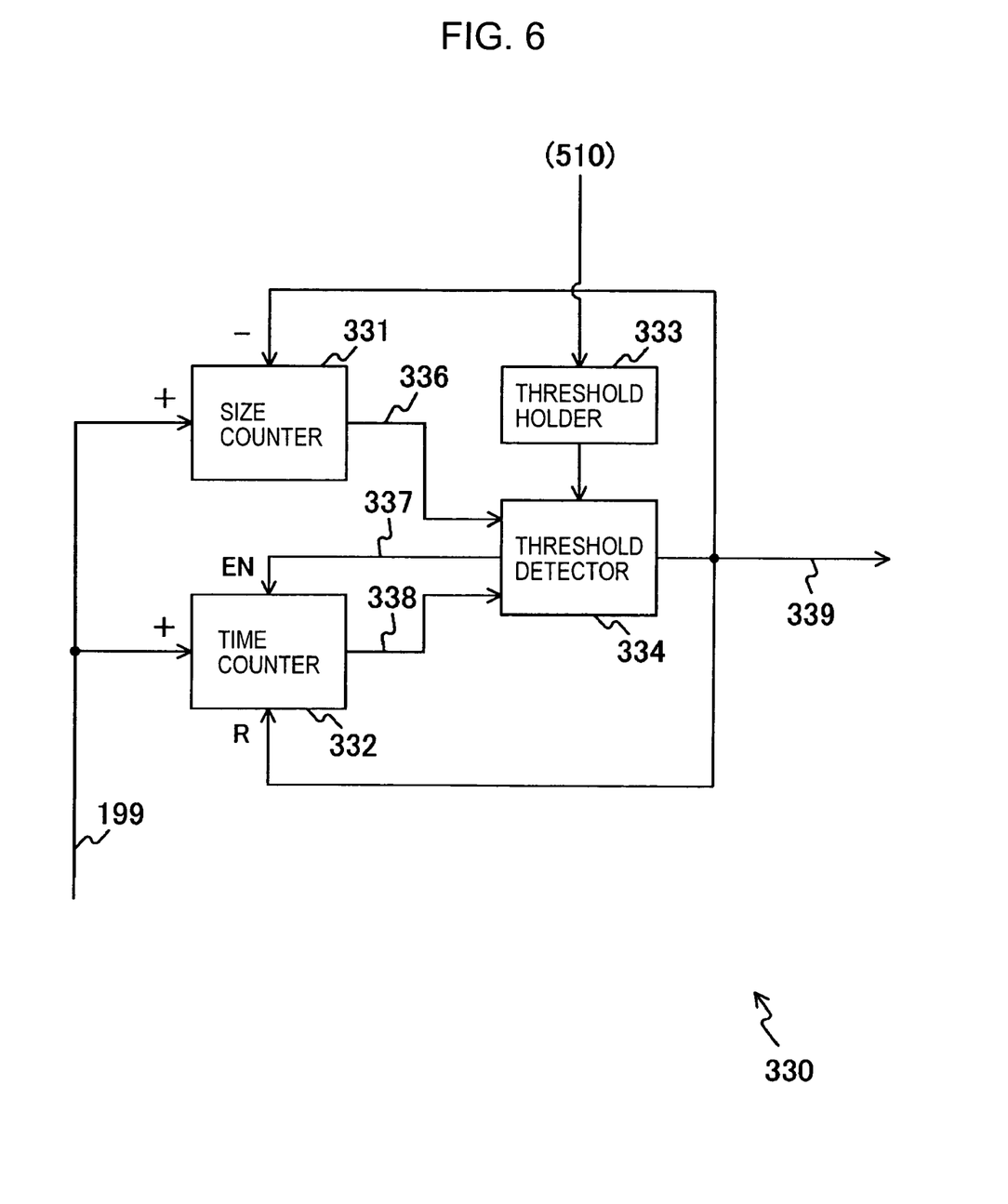
FIG. 6 illustrates a structure of a storage size detector 330 in accordance with one embodiment of the present invention.

FIG. 6 illustrates the structure of the storage size detector 330 in accordance with the embodiment of the present invention. The storage size detector 330 includes a size counter 331, a time counter 332, a threshold holder 333, and a threshold detector 334.

The size counter 331 monitors the moving image data input to the video stream buffer 310 via the signal line 199, thereby measuring the size of the moving image data stored in the video stream buffer 310. Upon detecting that the size of the moving image data stored in the video stream buffer 310 increases beyond a predetermined size, the size counter 331 so notifies the threshold detector 334 via a signal line 336. As shown in FIG. 5, if the size of the moving image data increases beyond 6 Mbytes, the size counter 331 so notifies the threshold detector 334 via the signal line 336.

The time counter 332 monitors the moving image data that is input to the video stream buffer 310 via the signal line 199. After the size of the moving image data stored in the video stream buffer 310 increases beyond a predetermined size (6 Mbytes), the time counter 332 measures the size of the moving image data stored in the video stream buffer 310 by converting the size of the moving image data into time. When the time converted size exceeds a predetermined duration of time, the time counter 332 so notifies the threshold detector 334 via a signal line 338. The time counter 332 is notified by the threshold detector 334 via a signal line 337, as shown in FIG. 5, that the moving image data increases beyond a predetermined amount, namely, 6 Mbytes. Upon detecting that three VOBUs (about 1.5 seconds) as the predetermined duration of time are stored, the time counter 332 so notifies the threshold detector 334 via the signal line 338.

The threshold holder 333 holds, as threshold values, the predetermined size in the size counter 331 and the predetermined duration of time in the time counter 332. These threshold values are set by the encoder controller 500.

Upon detecting that a measurement value of the size counter 331 increases beyond the predetermined size (6 Mbytes) of the threshold holder 333, the threshold detector 334 causes the time counter 332 via the signal line 337 to start measurement. Upon detecting that the measurement value of the time counter 332 increases beyond the predetermined time (3 VOBUs) of the threshold holder 333, the threshold detector 334 issues instructions via the signal line 339 to cause the video packer 350 and the audio packer 360 to retrieve data from the video stream buffer 310 and the audio stream buffer 320, respectively. In response to the instruction via the signal line 339, the size counter 331 subtracts the predetermined size (6 Mbytes) from the measurement value, and the time counter 332 resets the measurement value thereof to zero.

The encoding system of the embodiment of the present invention is described below with reference to the drawings.

Figure 7:
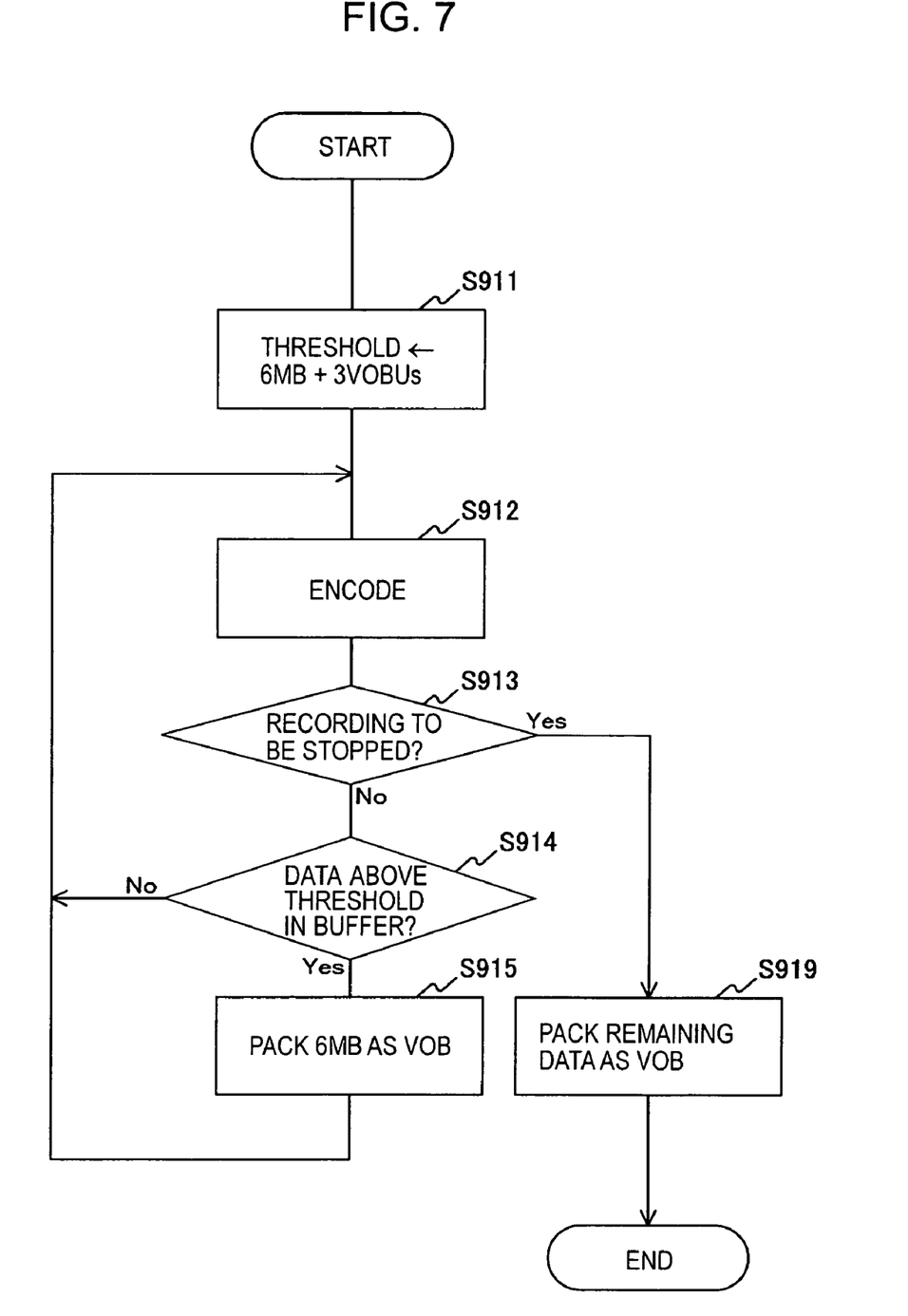
FIG. 7 illustrates the operation of an encoding system in accordance with one embodiment of the present invention.

FIG. 7 illustrates the operation of the encoding system in accordance with the embodiment of the present invention. When the start of chapter recording is instructed using a button or the like in the encoding system, the instruction is transferred to the entire system via the input/output interface 540. The video encoder 100 and the audio encoder 200 start encoding (step S912). The moving image data encoded by the video encoder 100 is stored in the video stream buffer 310, and the moving image data encoded by the audio encoder 200 is stored in the audio stream buffer 320. Prior to the storage of the data, the threshold holder 333 sets the predetermined size and the predetermined duration of time as the threshold values (step S911).

When a stop instruction for stopping the chapter recording is issued by a button (not shown) or the like, the instruction is transferred to the entire encoding system via the input/output interface 540. In response to the record stop instruction (step S913), the final data detector 340 detects that the final data of the chapter is stored in the video stream buffer 310, and causes the video packer 350 to pack the moving image data remaining in the video stream buffer 310 as the final VOB of the chapter (step S919). The packed moving image data is organized as the VOB by the VOBU generator 370 and the VOB generator. The recorder 400 then records the VOB onto the recording medium 490.

Until the chapter record stop instruction is issued, the storage size detector 330 monitors the size of the moving image data stored in the video stream buffer 310. Upon detecting (step S914) that the moving image data increases beyond the predetermined size (6 Mbytes) and then reaches the predetermined duration of time (3 VOBUs), the video packer 350 packs the moving image data of the predetermined size (6 Mbytes), stored in the video stream buffer 310, from the head thereof (step S915). The packed moving image data is organized into the VOB by the VOBU generator 370 and the VOB generator, and is then recorded onto the recording medium 490 by the recorder 400.

In accordance with the embodiment of the present invention, the storage size detector 330 measures the size of the moving image data stored in the video stream buffer 310, and when it is detected that the moving image data increases beyond the predetermined size and then reaches the predetermined duration of time, the moving image data of the predetermined size is retrieved from the video stream buffer 310. The time-converted final VOB of the recorded chapter is used to assure the predetermined duration of time.

In accordance with the embodiment of the present invention, the NTSC is used as a moving image playback system. The PAL method having a frame frequency of 25 Hz may also be used equally. In this case, one VOBU is converted into 15 frames/25 Hz=0.6 second. Three VOBUs assures 1.8 seconds. If one GOP is composed of 12 frames, 14 frames/25 Hz=0.48 second. Four VOBUs assures 1.92 seconds. The measurement threshold of the threshold holder 333 may be set to 4 VOBUs.

In the discussion of the embodiment of the present invention, the elements of the recorder controller 300 are implemented in hardware. Alternatively, the recorder controller 300 may be implemented in hardware and/or software. For example, programs may be stored in one of the ROM 520 and the RAM 530 in the encoder controller 500, and the processor 510 performs the above-referenced function.

The embodiment of the present invention has been discussed for exemplary purposes only. Elements in the embodiment correspond to elements in the claim, as is discussed below. The present invention is not limited to the correspondence, and a variety of changes is possible without departing from the scope of the present invention.

In the invention (1), the buffer corresponds to the video stream buffer 310. The first size corresponds to the predetermined size (6 Mbytes in the example of FIG. 5). The second size corresponds to the predetermined time-converted size (3 VOBUs of FIG. 5). The storage size detecting means corresponds to the storage size detector 330. The final data detecting means corresponds to the final data detector 340. The moving image object output means corresponds to the video packer 350 and the multiplexer 390.

In accordance with the invention (2), the size measurement means corresponds to the size counter 331. The time measurement means corresponds to the time counter 332. The threshold detecting means corresponding to the threshold detector 334.

In accordance with the invention (3), the threshold holding means corresponding to the threshold holder 333.

In accordance with the invention (4), the threshold setting means corresponds to the processor 510.

In accordance with the invention (5), the packing means corresponds to the video packer 350. The multiplexing means corresponds to the multiplexer 390.

In accordance with the invention (6), the moving image encoding means corresponds to the video encoder 100. The audio encoding means corresponds to the audio encoder 200. The buffer corresponds to the video stream buffer 310. The first size corresponds to the predetermined size (6 Mbytes in the example of FIG. 5). The second size corresponds to the predetermined time-converted size (3 VOBUs of FIG. 5). The storage size detecting means corresponds to the storage size detector 330. The final data detecting means corresponds to the final data detector 340. The moving image object output means corresponds to the video packer 350 and the multiplexer 390.

In accordance with the invention (7) or (9), step S912 corresponds to the step of encoding the moving image data and outputting successively the encoded moving image data to the buffer. Step S914 corresponds to the step of detecting that the moving image data stored in the buffer increases in size beyond a first size and then reaches a second size. Step S915 corresponds to the step of retrieving a portion of the moving image data, stored in the buffer, corresponding to the first size from the head of the moving image data, and outputting the retrieved portion of the moving image data as a moving image object if it is detected that the size of the moving image data stored in the buffer reaches the second size. Step S913 corresponds to the step of detecting that the final moving image data belonging to the chapter is stored in the buffer. Step S919 corresponds to the step of retrieving the whole moving image data stored in the buffer and outputting the retrieved moving image data as a moving image object if it is detected that the final moving image data belonging to the chapter is stored in the buffer.

In accordance with the invention (8) or (10), step S911 corresponds to the step of setting the first size of the moving image object as a standard size of a moving image object, and the second size of the moving image object as a lower limit value of the moving image object for seamless connection. Step S912 corresponds to the step of encoding the moving image data and outputting successively the encoded moving image data to the buffer.

Step S914 corresponds to the step of detecting that the moving image data stored in the buffer increases in size beyond a first size and then reaches a second size. Step S915 corresponds to the step of retrieving a portion of the moving image data, stored in the buffer, corresponding to the first size from the head of the moving image data, and outputting the retrieved portion of the moving image data as a moving image object if it is detected that the size of the moving image data stored in the buffer reaches the second size. Step S913 corresponds to the step of detecting that the final moving image data belonging to the chapter is stored in the buffer. Step S919 corresponds to the step of retrieving the whole moving image data stored in the buffer and outputting the retrieved moving image data as a moving image object if it is detected that the final moving image data belonging to the chapter is stored in the buffer.

The procedure discussed with reference to the embodiment of the present invention may be considered as a method for performing a series of steps, a program for causing a computer to perform the series of steps, or a recording medium storing the program.

INDUSTRIAL APPLICABILITY

The present invention is applicable to the encoding of a moving image signal into a MPEG format moving signal and the writing of the MPEG format moving image signal onto a DVD.

The invention claimed is:

1. A record control apparatus comprising:
a buffer for storing moving image data belonging to a chapter,
storage size detecting means for detecting that the moving image data stored in the buffer increases in size beyond a first size which is a size of a moving image object other than a final moving image object and then reaches a second size which is a size of a moving image object for a seamless connection,
final data detecting means for detecting that a final moving image data belonging to the chapter is stored in the buffer, and
moving image object output means for retrieving a portion of the moving image data, stored in the buffer, corresponding to the first size from the head of the moving image data, and outputting the portion of the moving image data as the moving image object if it is detected that the moving image data stored in the buffer reaches the second size over the first size, and retrieving a whole moving image data stored in the buffer and outputting the retrieved moving image data as a moving image object if it is detected that the final moving image data belonging to the chapter is stored in the buffer.

2. The record control apparatus according to claim 1, wherein the storage size detecting means comprises:
size measurement means for measuring a size of the moving image data stored in the buffer,
time measurement means for measuring time by converting, into time, the size of the moving image data stored in the buffer, and
threshold detecting means for detecting that the time measurement means detects the second size after the size measurement means detects the first size.

3. The record control apparatus according to claim 2, wherein the storage size detecting means further comprises threshold holding means for holding the first size and the second size and supplying the threshold detecting means with the first size and the second size.

4. The record control apparatus according to claim 3, further comprising threshold setting means for setting the first size of the moving image object as a standard size of the moving image object, and the second size of the moving image object as a lower limit value of the moving image object for the seamless connection.

5. The record control apparatus according to claim 1, wherein the moving image object output means comprises packing means for dividing the moving image data retrieved from the buffer into packs, each pack having a fixed length, and
multiplexing means for multiplexing the packed moving image data and outputting the multiplexed moving image data as the moving image object.

6. An encoding system comprising:
moving image encoding means for encoding a moving image signal and outputting the encoded moving image signal as moving image data,
audio encoding means for encoding an audio signal and outputting the encoded audio signal as audio data,
a buffer for storing the moving image data belonging to a chapter,
storage size detecting means for detecting that the moving image data stored in the buffer increases in size beyond a first size which is a size of a moving image object other than a final moving image object and then reaches a second size which is a size of a moving image object for a seamless connection,
final data detecting means for detecting that a final moving image data belonging to the chapter is stored in the buffer,
moving image object output means for retrieving a portion of the moving image data, stored in the buffer, corresponding to the first size from the head of the moving image data, multiplexing, as a moving image object, the retrieved portion of the moving image data and the audio data, and outputting the moving image object if it is detected that the size of the moving image data stored in the buffer reaches the second size over the first size, and retrieving a whole moving image data stored in the buffer, multiplexing, as a moving image object, the retrieved moving image data and the audio data, and outputting the moving image object if it is detected that the final moving image data belonging to the chapter is stored in the buffer.

7. A record control method of a record control apparatus having a buffer storing moving image data belonging to a chapter, comprising:
- a step of encoding the moving image data and outputting successively the encoded moving image data to the buffer,
- a step of detecting that the moving image data stored in the buffer increases in size beyond a first size which is a size of a moving image object other than a final moving image object and then reaches a second size which is a size of a moving image object for a seamless connection,
- a step of retrieving a portion of the moving image data, stored in the buffer, corresponding to the first size from the head of the moving image data, and outputting the retrieved portion of the moving image data as the moving image object if it is detected that the size of the moving image data stored in the buffer reaches the second size over the first size,
- a step of detecting that a final moving image data belonging to the chapter is stored in the buffer, and
- a step of retrieving a whole moving image data stored in the buffer and outputting the retrieved whole moving image data as a moving image object if it is detected that the final moving image data belonging to the chapter is stored in the buffer.

8. A record control method of a record control apparatus having a buffer storing moving image data belonging to a chapter, comprising:
- a step of setting a first size of a moving image object as a standard size of the moving image object, and a second size of the moving image object as a lower limit value of the moving image object for seamless connection,
- a step of encoding the moving image data and outputting successively the encoded moving image data to the buffer,
- a step of detecting that the moving image data stored in the buffer increases in size beyond the first size which is a size of a moving image object other than a final moving image object and then reaches the second size which is a size of a moving image object for a seamless connection,
- a step of retrieving a portion of the moving image data, stored in the buffer, corresponding to the first size from the head of the moving image data, and outputting the retrieved portion of the moving image data as the moving image object if it is detected that the size of the moving image data stored in the buffer reaches the second size over the first size,
- a step of detecting that a final moving image data belonging to the chapter is stored in the buffer, and
- a step of retrieving a whole moving image data stored in the buffer and outputting the retrieved whole moving image data as a moving image object if it is detected that the final moving image data belonging to the chapter is stored in the buffer.

9. A computer program for causing a computer to perform a record control method of a record control apparatus having a buffer storing moving image data belonging to a chapter, said computer program stored on a computer readable medium and including program code for performing steps comprising:
- a step of encoding the moving image data and outputting successively the encoded moving image data to the buffer,
- a step of detecting that the moving image data stored in the buffer increases in size beyond a first size which is a size of a moving image object other than a final moving image object and then reaches a second size which is a size of a moving image object for a seamless connection,
- a step of retrieving a portion of the moving image data, stored in the buffer, corresponding to the first size from the head of the moving image data, and outputting the retrieved portion of the moving image data as the moving image object if it is detected that the size of the moving image data stored in the buffer reaches the second size over the first size,
- a step of detecting that a final moving image data belonging to the chapter is stored in the buffer, and
- a step of retrieving a whole moving image data stored in the buffer and outputting the retrieved whole moving image data as a moving image object if it is detected that the final moving image data belonging to the chapter is stored in the buffer.

10. A computer program for causing a computer to perform a record control method of a record control apparatus having a buffer storing moving image data belonging to a chapter, said computer program stored on a computer readable medium and including program code for performing steps comprising:
- a step of setting a first size of the moving image object as a standard size of a moving image object, and a second size of the moving image object as a lower limit value of the moving image object for seamless connection,
- a step of encoding the moving image data and outputting successively the encoded moving image data to the buffer,
- a step of detecting that the moving image data stored in the buffer increases in size beyond the first size which is a size of a moving image object other than a final moving image object and then reaches the second size which is a size of a moving image object for a seamless connection,
- a step of retrieving a portion of the moving image data, stored in the buffer, corresponding to the first size from the head of the moving image data, and outputting the retrieved portion of the moving image data as the moving image object if it is detected that the size of the moving image data stored in the buffer reaches the second size over the first size,
- a step of detecting that a final moving image data belonging to the chapter is stored in the buffer, and
- a step of retrieving a whole moving image data stored in the buffer and outputting the retrieved whole moving image data as a moving image object if it is detected that the final moving image data belonging to the chapter is stored in the buffer.

* * * * *